United States Patent [19]

Takaaki

[11] 4,171,035

[45] Oct. 16, 1979

[54] DISC BRAKE ASSEMBLY AND GUIDE STRUCTURE THEREFOR

[75] Inventor: Ota Takaaki, Okazaki, Japan

[73] Assignee: Toyota Jidosha Kogyo Kabushiki Kaisha, Aichi, Japan

[21] Appl. No.: 937,977

[22] Filed: Aug. 30, 1978

Related U.S. Application Data

[63] Continuation of Ser. No. 744,518, Nov. 24, 1976, abandoned, which is a continuation of Ser. No. 586,254, Jun. 12, 1975, abandoned, which is a continuation of Ser. No. 465,472, Apr. 30, 1974, abandoned.

[30] Foreign Application Priority Data

May 18, 1973 [JP] Japan ................................. 48-54720

[51] Int. Cl.² .......................................... F16D 55/224
[52] U.S. Cl. .................... 188/73.3; 74/18.2; 277/59
[58] Field of Search ................ 188/72.4, 73.3, 73.4; 74/18.2; 277/59, 88, 212 FB

[56] References Cited

U.S. PATENT DOCUMENTS

| 3,194,351 | 7/1965 | Swift | 188/72.4 |
| 3,482,655 | 12/1969 | Walther | 188/73.3 X |
| 3,656,590 | 4/1972 | Newstead | 188/73.3 |
| 3,682,277 | 8/1972 | Brown | 188/73.3 |
| 3,805,925 | 4/1974 | Schoenhenz | 188/73.3 |
| 3,881,576 | 5/1975 | Haraikawa et al. | 188/73.3 X |
| 3,897,858 | 8/1975 | Toshida et al. | 188/73.4 |
| 3,917,033 | 11/1975 | Rath et al. | 188/73.3 |

*Primary Examiner*—George E. A. Halvosa
*Attorney, Agent, or Firm*—Toren, McGeady & Stanger

[57] ABSTRACT

A disc brake assembly includes a pair of brake pads adapted to frictionally engage on opposite sides thereof a disc rotating with an associated wheel to be braked. A piston and cylinder assembly responsive to applied braking fluid pressure actuates the brake pads. A guide operatively interposed between the cylinder and a torque receiving member direct the cylinder for braking movement normal to the brake disc by operation of pins sliding within bosses formed on opposite sides of the cylinder.

2 Claims, 3 Drawing Figures

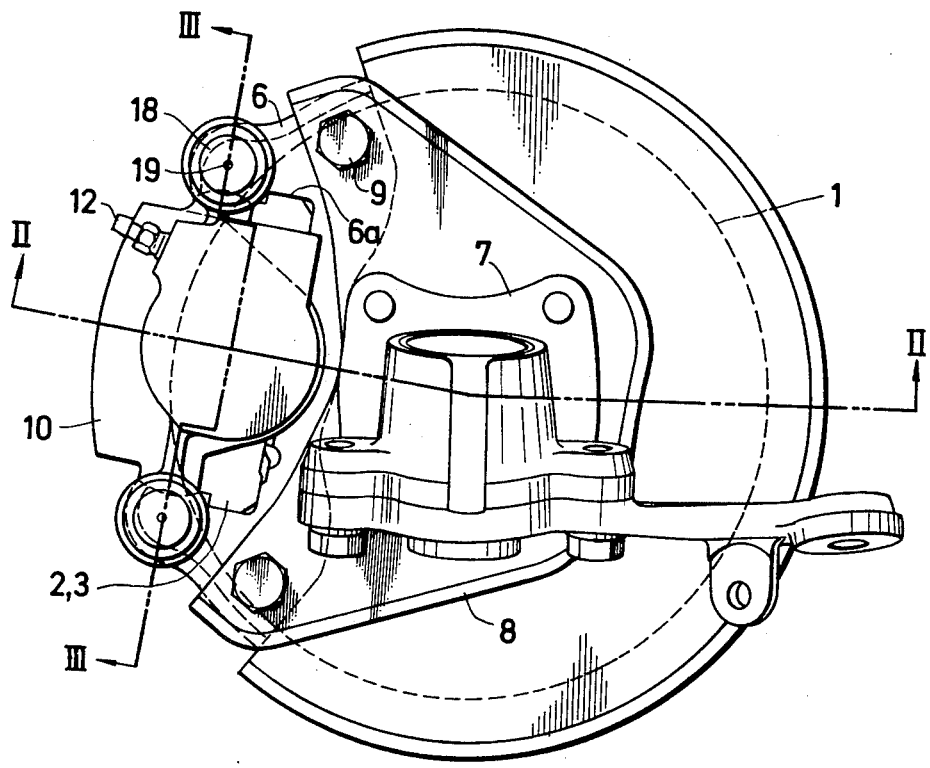
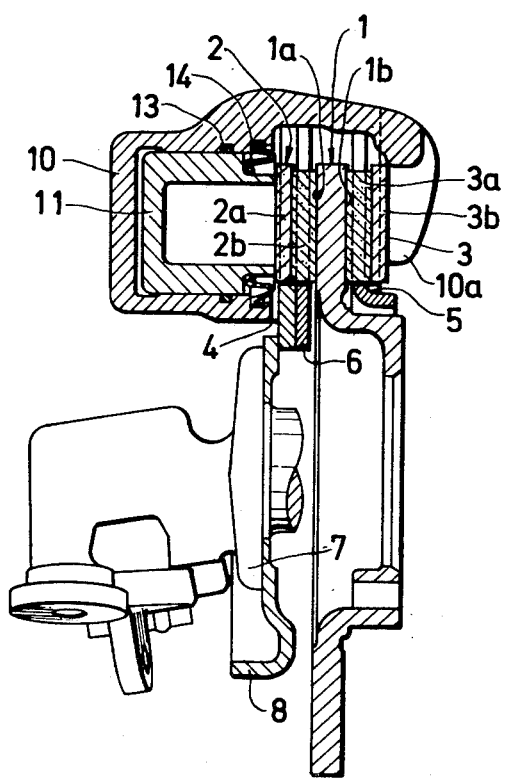
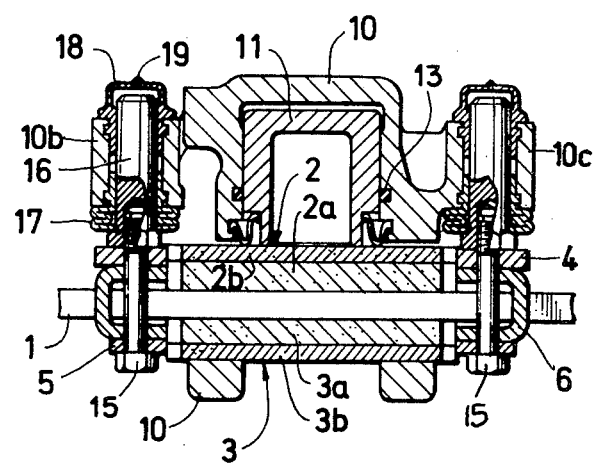

DISC BRAKE ASSEMBLY AND GUIDE STRUCTURE THEREFOR

This is a continuation application of Ser. No. 744,518 filed Nov. 24, 1976, which in turn is a continuation of application Ser. No. 586,254 filed June 12, 1975 which in turn is a continuation of application Ser. No. 465,472 filed Apr. 30, 1974, all now abandoned.

BACKGROUND OF THE INVENTION

The present invention relates to disc brakes of the floating cylinder type for braking wheeled vehicles such as automobiles and, more particularly, to improvements in the mechanism for guiding a cylinder of the brake which urges a brake pad against one side of a disc at the time of braking.

In disc brakes of the type to which the present invention relates, a brake pad is urged against one side of a disc by a piston upon application of braking fluid pressure exerted thereupon at the time of braking. At the same time a reaction force is created which is utilized to displace the cylinder of the brake assembly in a direction opposite to the direction of displacement of the piston for urging the other disc pad against the opposite side of the disc to thereby stop the rotation of the disc. This requires that the cylinder as well as the piston be movably guided during its displacement. The guiding mechanism which is usually provided is arranged at a position located eccentrically with respect to the centroid of the cylinder, and it is thus prone to great momentum force and severe wear. Also, such a guiding mechanism involves constructional disadvantages from the viewpoint of preventing collection of mud and rust.

The present invention is directed toward overcoming the prior art drawbacks previously mentioned and is intended to prevent mud collection by providing a guiding mechanism having a pin type construction arranged on the side of the cylinder separately from the brake torque receiving section.

SUMMARY OF THE INVENTION

Briefly, the present invention may be described as a disc brake assembly comprising, in combination, a disc mounted to rotate with an associate wheel, a pair of brake pads arranged on opposite sides of the disc and adapted to be brought in contact therewith, a piston adapted to urge one of said brake pads against one side of said disc in response to braking fluid pressure applied thereto, a cylinder operatively associated with said piston adapted to urge the other of said brake pads against the opposite side of said disc under the influence of a reaction force created in said cylinder by application therein of said braking oil pressure, a torque receiving member mounted relative to said brake pads for receiving braking torque developed in said pads to prevent relative movement of said pads circumferentially of said disc, and guide means for guiding movement of the cylinder during application of the braking oil pressure. The invention is particularly directed to the guide means which comprise bosses formed on opposite sides of the cylinder and guide pins extending in engagement with the bosses for guiding movement of the pins relative to the bosses. The guide means are connected between the cylinder and the torque receiving member and operate to guide the cylinder for movement in directions normal to the brake disc by the engagement between the pins and the bosses.

By one aspect of the invention, the bosses are fixed relative to the cylinder and the pins are fixed relative to the torque receiving member. The bosses may be integrally formed on opposite sides of the cylinder and boot means formed of resilient material are provided to extend between each of the bosses and an associated guide pin to form a resilient external seal therefor.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

FIG. 1 is a side view showing an embodiment of the disc brake according to the invention;

FIG. 2 is a sectional view taken along line II—II in FIG. 1; and

FIG. 3 is a sectional view taken along line III—III in FIG. 1.

DESCRIPTION OF THE PREFERRED EMBODIMENT

Referring to FIG. 1, there is shown a pair of brake pads 2 and 3 arranged on opposite sides 1a and 1b of a disc 1 rotatable in unison with a wheel (not shown). The brake pads 2 and 3 are assembled in a channel-shaped notch 6a of a torque receiving member 6 provided with reinforcing members 4 and 5. The torque receiving member 6 has its opposite ends secured by bolts 9 to a bracket 8 integral with a stationary bracket 7, whereby the movement of the brake pads 2 and 3 in the circumferential direction of the disc is prevented. As shown in FIGS. 2 and 3, the brake pads 2 and 3 consist of respective friction members 2a and 3a adapted to be in frictional contact with the respective sides 1a and 1b of the disc 1 and metallic back members 2b and 3b provided on the back side of the frictional members 2a and 3a. A piston 11 movably inserted in a cylinder 10 is in contact with the rear of the back member 2b of the brake pad 2, while the cylinder 10 has an arm 10a extending beyond the disc 1 and in contact with the back member 3b of the other brake pad 3. The cylinder 10 is provided with a duct 12 for supplying the brake fluid pressure, a seal 13 for sealing the brake fluid pressure and boots 14 for protecting the inner wall of the cylinder, the outer wall of the piston and the seal 13 from mud or other contaminating substances.

The guiding mechanism for guiding the cylinder, which constitutes the principle aspect of the invention, comprises bosses 10b and 10c extending integrally on opposite sides of the cylinder 10 perpendicular to the disc surface. Guide pins 16 secured by bolts 15 to the torque receiving member 6 extend through the interior of the bosses 10b and 10c to guide the cylinder 10 in a direction perpendicular to the disc surface. Boots 17 and 18 of a resilient material are provided on or between the bosses 10b and 10c and guide pins 16. The boots serve to protect the guiding portions from external mud and also provide for interference to prevent jolting of the cylinder and leakage of a lubricant for ensuring smooth frictional movement. Also, a needle hole 19 is provided at the tip of the boots 18 to prevent dragging at the time of brake releasing due to a change of the inner pressure with change of the volume.

With the construction described above, with brake pressure supplied through the duct 12 to the cylinder 10 the piston 11 is displaced to urge the friction member 2a of the brake pad 2 together with the back member 2b against one side 1a of the rotating disc 1. At this time, the cylinder 10 is also moved by the reaction force which is created along the guide pins 16 in a direction opposite to the direction of movement of the piston 11, so that the arm 10a of the cylinder 10 urges the friction member 3a of the other brake pad 3 against the other side 1b of the disc 1. In this way, braking action is brought about due to the force of friction between the disc 1 and the friction members 2a and 3a, thus stopping the disc 1 with the brake torque being exerted upon the torque receiving member 6. When replacing the brake pads 2 and 3, the connection of the guide pins 16 to the torque receiving member 6 is released by removing the bolts 15. The brake pads 2 and 3 may then be readily removed from the cylinder 10 together with the piston 11, seal 13, guide pins 16 and boots 14, 17 and 18.

As has been described in the foregoing, according to the invention the guiding mechanism for guiding the cylinder is provided on the side of the cylinder near the centroid thereof, so that it will experience less momentum and have an extended service life. Also, since the guiding mechanism is of a pin type construction, mud prevention boots or the like may be readily and effectively provided. Further, since the guide pins 16 are not subject to the brake force, a constructional advantage is realized. Furthermore, there is no need of providing any particular anti-jolt spring in the guiding mechanism. Moreover, at the time of replacement of the brake pads 2 and 3 there is no need of removing the guide pins 16 from the respective bosses 10b and 10c, so that the initial positional relationship between the two may be satisfactorily maintained.

While a specific embodiment of the invention has been shown and described in detail to illustrate the application of the inventive principles, it will be understood that the invention may be embodied otherwise without departing from such principles.

What is claimed is:

1. A disc brake assembly comprising, in combination:
a disc mounted to rotate with an associated wheel;
a pair of brake pads arranged on opposite sides of said disc and adapted to be brought into contact therewith to frictionally brake rotation of said wheel;
a piston adapted to urge one of said brake pads against one side of said disc in response to braking fluid pressure applied thereto:
a cylinder operatively associated with said piston adapted to urge the other of said brake pads against the opposite side of said disc under the influence of a reaction force created in said cylinder between said piston and said cylinder by application therein of said braking fluid pressure;
a torque receiving member mounted to receive braking torque developed in said pads by braking engagement thereof against said disc to prevent relative movement of said pads circumferentially of said disc;
guide means for guiding movement between said piston and said cylinder during application of said braking fluid pressure, said guide means comprising
boss means formed on said cylinder and fixed relative thereto,
pin means extending in sliding engagement within said boss means for effecting guided relative movement therebetween,
means detachably fixing said pin means to said torque receiving member, and
boot means formed of resilient material extending between said boss means and said pin means to form a resilient external seal for said guide means against contaminating materials;
said guide means operating between said cylinder and said torque receiving means to guide movement of said cylinder in directions normal to said disc by the guiding engagement between said pin means and said boss means;
said boss means comprising a generally open-ended cylindrical configuration encircling said pin means with an annular gap being formed between said pin means and said boss means, said boot means comprising a pair of resilient boots each formed at one of said open ends of said boss means, each of said resilient boots including a cylindrical root portion extending into said annular gap with the root portion of one of said boots being in a spaced apart relationship relative to the root portion of the other of said boots to define therebetween within said annular gap an annular clearance forming a reservoir for lubricating material;
means defining on said boss means an inner wall thereof having formed therein annular grooves; and
radial flanges formed on each of said cylindrical root portions of said boots;
said boots being fixed relative to said boss means with said radial flanges engaged within said annular grooves;
said pin means being arranged in axial sliding engagement within said cylindrical root portions of said resilient boots, with lubricating material within said reservoir operating to lubricate said axial sliding engagement between said pin means and said cylindrical root portions.

2. An assembly according to claim 1 wherein said boss means comprise a pair of bosses formed on opposite sides of said cylinder and wherein said pin means comprise a pair of pins each engaged respectively within one of said bosses, each of said bosses and associated pin having a pair of said resilient boots engaged therebetween.

* * * * *

UNITED STATES PATENT OFFICE
CERTIFICATE OF CORRECTION

Patent No. 4,171,035  Dated October 16, 1979

Inventor(s) Takaaki Ota

It is certified that error appears in the above-identified patent and that said Letters Patent are hereby corrected as shown below:

In the heading of the Patent [75] should read as follows:

[75] Inventor: Takaaki Ota, Okazaki, Japan

Signed and Sealed this

Twenty-second Day of April 1980

[SEAL]

Attest:

SIDNEY A. DIAMOND

*Attesting Officer*  *Commissioner of Patents and Trademarks*